Figure 1:
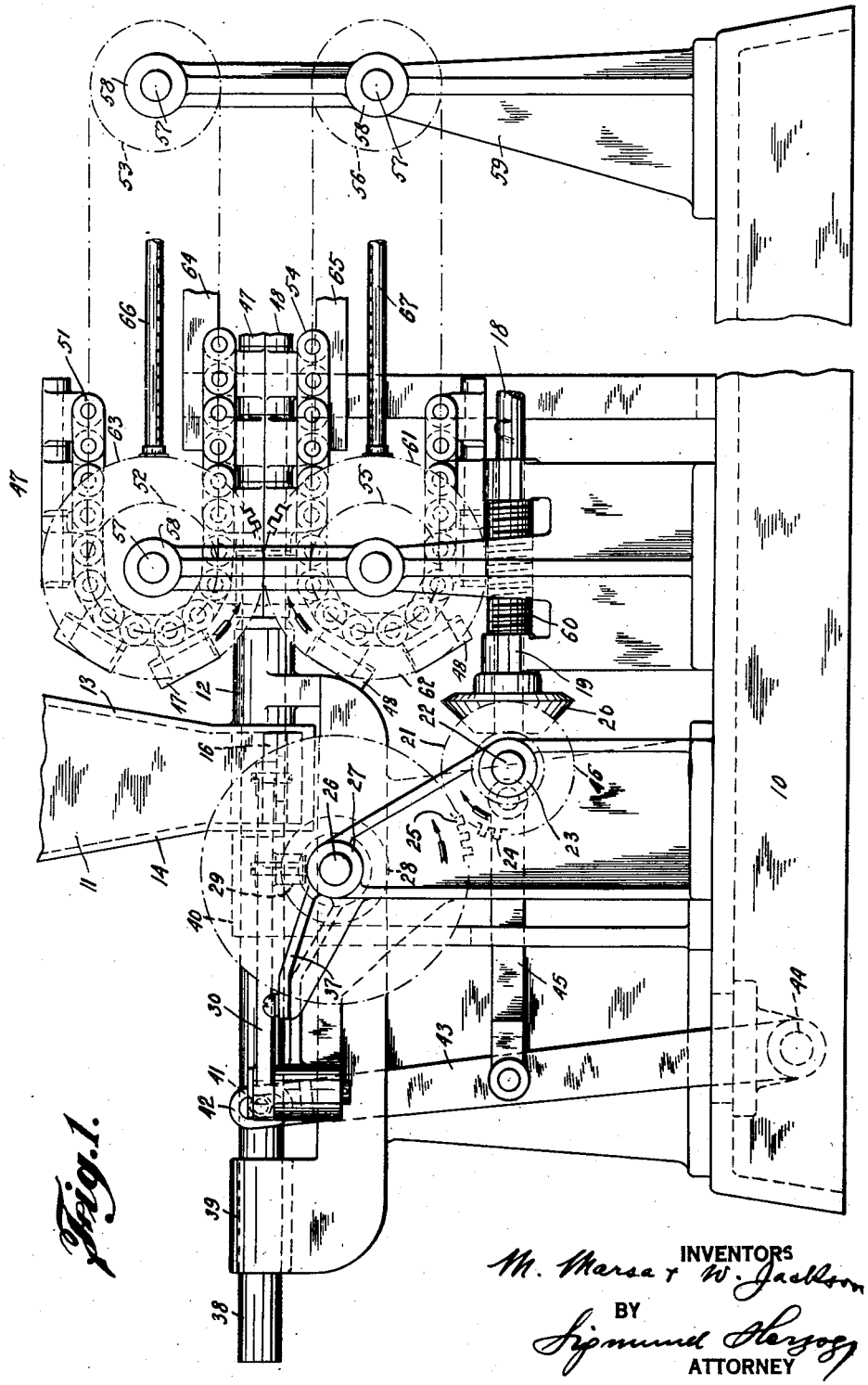

March 23, 1926.

M. MARSA ET AL 1,577,922

PROCESS OF AND APPARATUS FOR MAKING CORK ARTICLES

Filed July 19, 1924    6 Sheets-Sheet 2

INVENTORS
M. Marsa + W. Jackson
BY
Sigmund Herzog
ATTORNEY

March 23, 1926.

M. MARSA ET AL 1,577,922

PROCESS OF AND APPARATUS FOR MAKING CORK ARTICLES

Filed July 19, 1924   6 Sheets-Sheet 3

INVENTORS
M. Marsa & W. Jackson
BY
Sigmund Herzog
ATTORNEY

March 23, 1926. 1,577,922
M. MARSA ET AL
PROCESS OF AND APPARATUS FOR MAKING CORK ARTICLES
Filed July 19, 1924    6 Sheets-Sheet 5
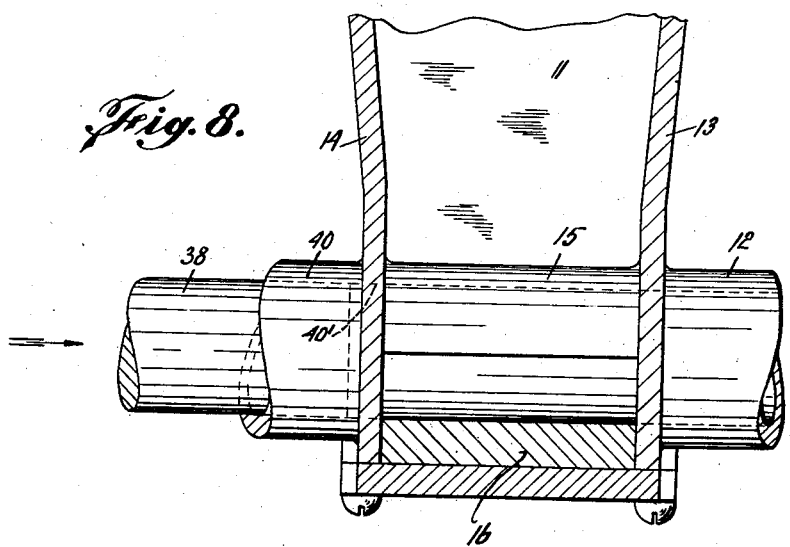
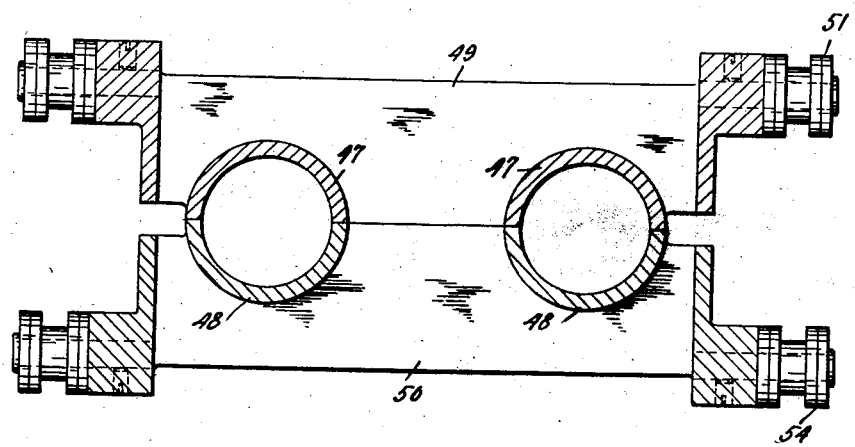

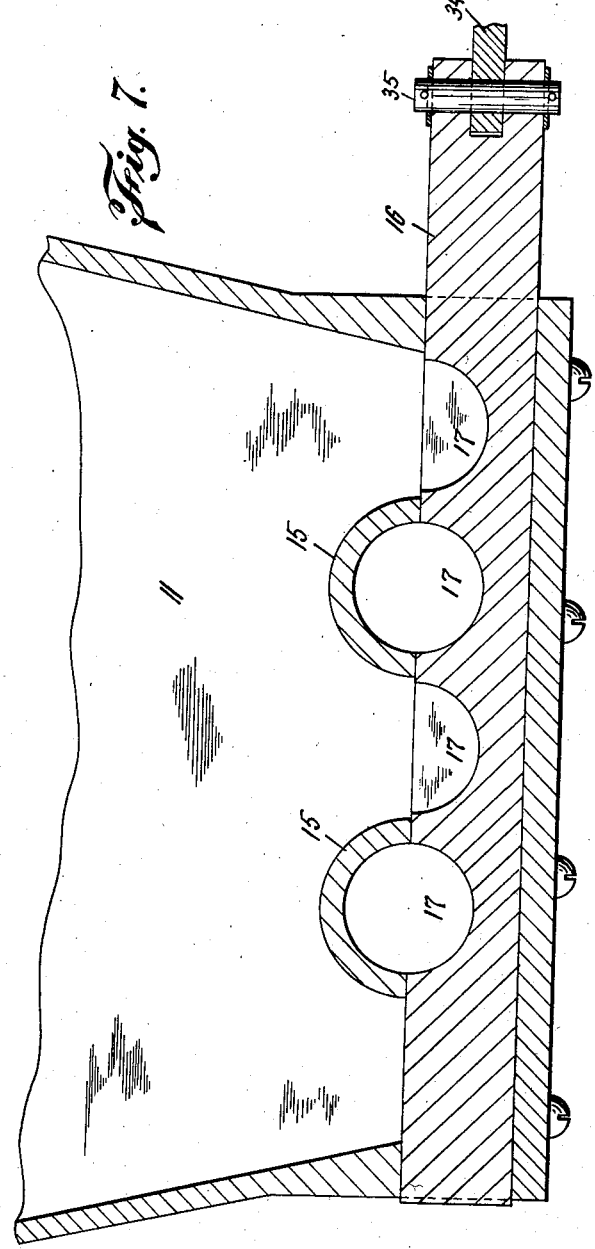

Patented Mar. 23, 1926.

1,577,922

UNITED STATES PATENT OFFICE.

MELCHOR MARSA AND WILLIAM JACKSON, OF BROOKLYN, NEW YORK, ASSIGNORS, BY MESNE ASSIGNMENTS, TO NEW PROCESS CORK COMPANY, INC., OF BROOKLYN, NEW YORK, A CORPORATION OF NEW YORK.

PROCESS OF AND APPARATUS FOR MAKING CORK ARTICLES.

Application filed July 19, 1924. Serial No. 727,003.

*To all whom it may concern:*

Be it known that we, MELCHOR MARSA and WILLIAM JACKSON, citizens of Spain and the United States, respectively, and residents of Brooklyn, in the county of Kings and State of New York, have invented certain new and useful Improvements in a Process of and Apparatus for Making Cork Articles, of which the following is a specification.

The present invention relates to a process of and apparatus for manufacturing articles of comminuted or granulated cork. It pertains more particularly to a process of and apparatus for forming rods especially adapted for use in producing what is known in the trade as composition cork articles, such as, for instance, cork disks or other sealing devices used in the bottling or analogous arts, although such rods may be used for various other purposes.

In forming cork rods of the type mentioned, the granulated cork is mixed with a suitable binding agent, which is adapted to coagulate and unite the particles of cork when subjected to a proper degree of heat and pressure, and when cool becomes insoluble and practically unaffected by any degree of heat to which the finished article may be subjected without being destroyed or consumed. The comminuted cork prepared as stated is usually packed into a confining tube or mold, the filled or packed tube being heated in an oven to the desired degree, the rod so obtained being then removed from the mold and severed into sections of the desired length of thickness to form bottle cap sealing disks, gaskets, packing rings, etc.

The main object of the present invention is to provide an improved process of and apparatus for uniting the particles of cork by the coagulation of the binding agent and for giving the united material the desired shape, such process being continuous, thereby increasing the production and reducing the number of operations necessary in the production of the articles.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims, without departing from the spirit or sacrificing any of the advantages of the invention.

Generally speaking the improved process and apparatus is of the extrusion type, the comminuted cork, having the binder incorporated therein, being forced into and through a confining tube or mold, wherein it is subjected to heat sufficient to effect coagulation of the binder, the cork particles being added in succeeding increments to the body passing into and through the tube or mold and being advanced by an intermittently acting or reciprocatory plunger, whereby the particles are compressed, to be heated after compression. In carrying the process into practice, the tube or mold is made of two sets of moving semi-tubular sections, the members of one set complementing those of the other set to form tube sections, into which the granular material is fed, the arrangement being, preferably, such that the semi-tubular sections of each set form an endless chain, the members of one set being held in abutting tube-forming complementary positions with the members of the other set to form a tube of considerable length.

In carrying the process into practice, it is preferred to employ a plurality of co-acting tube sets, fed from a common hopper, and also a plurality of plungers which are operated simultaneously to obtain economy and increased output.

Figure 2:
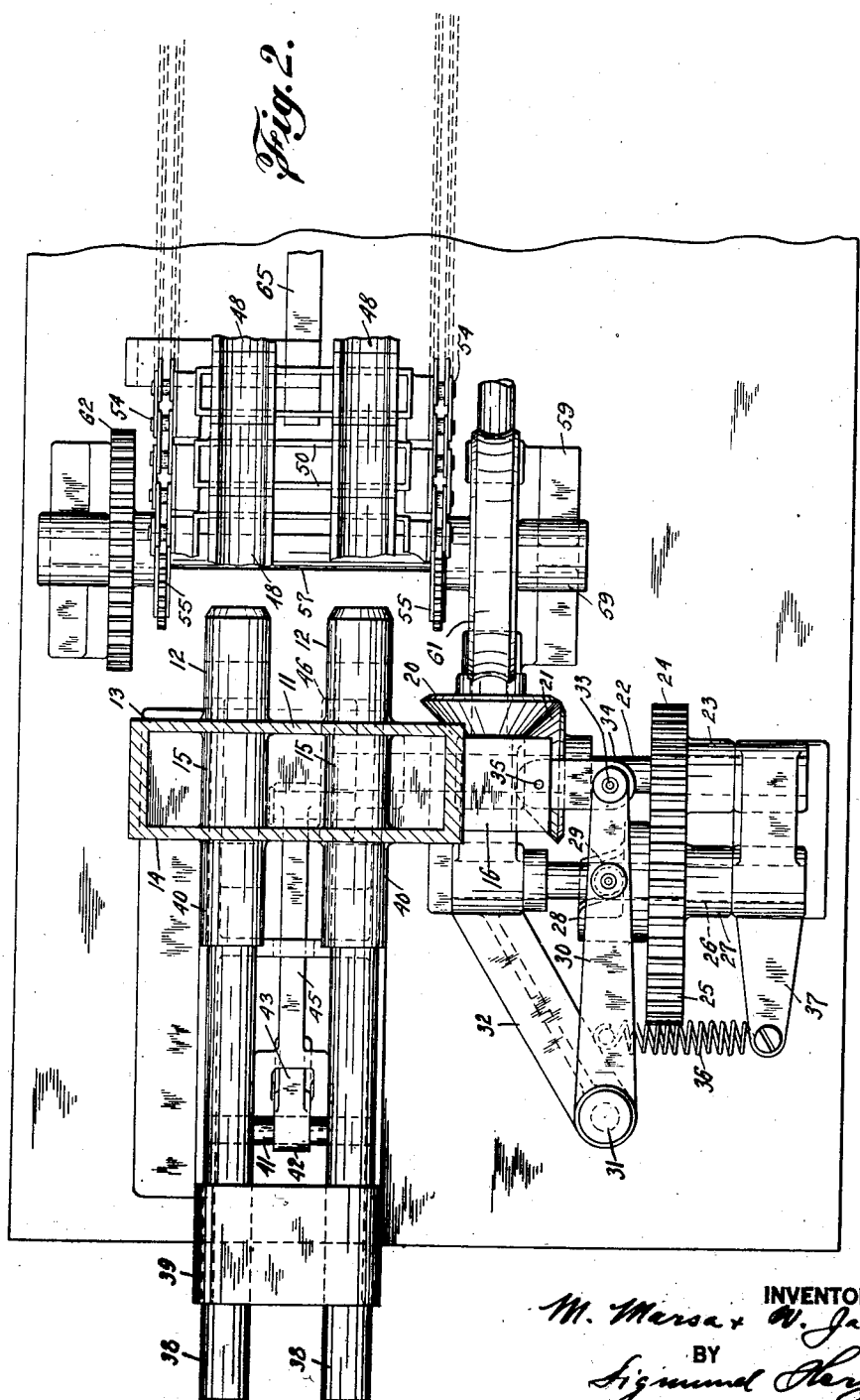
Figure 3:
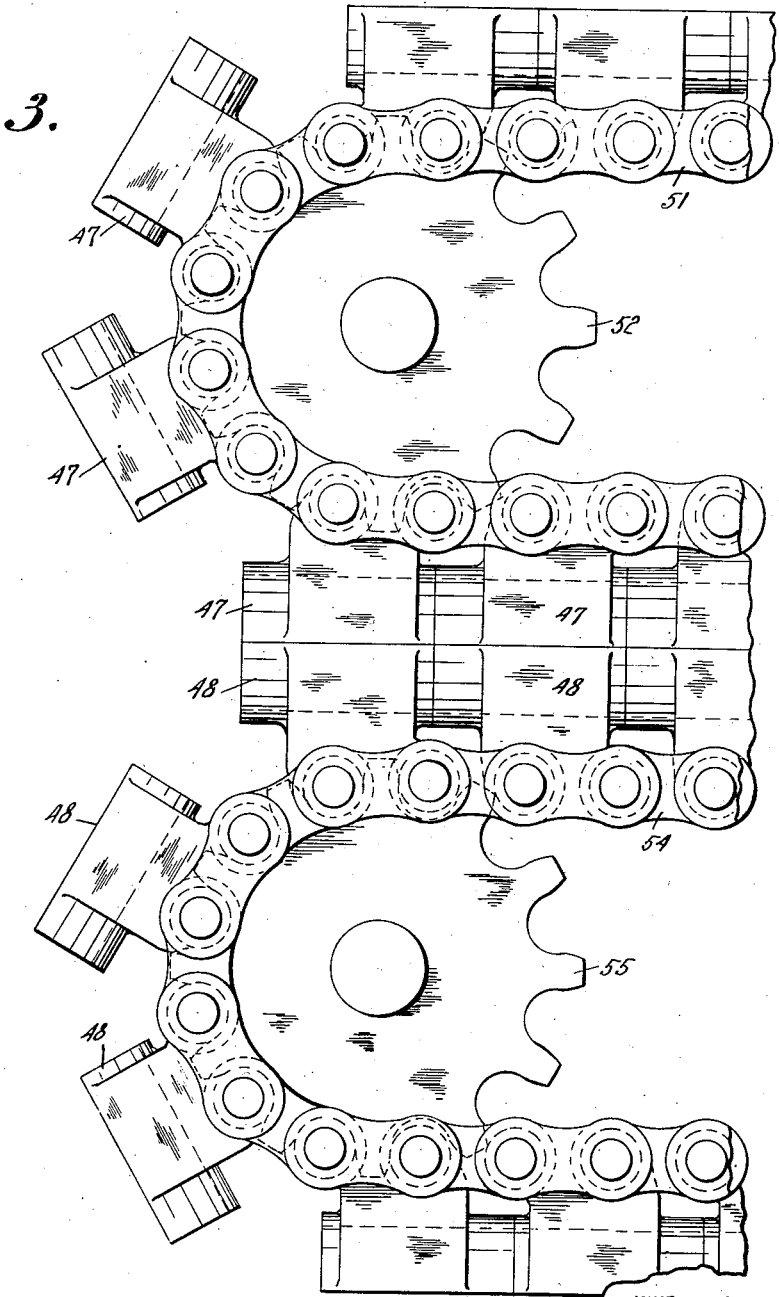
Figure 5:
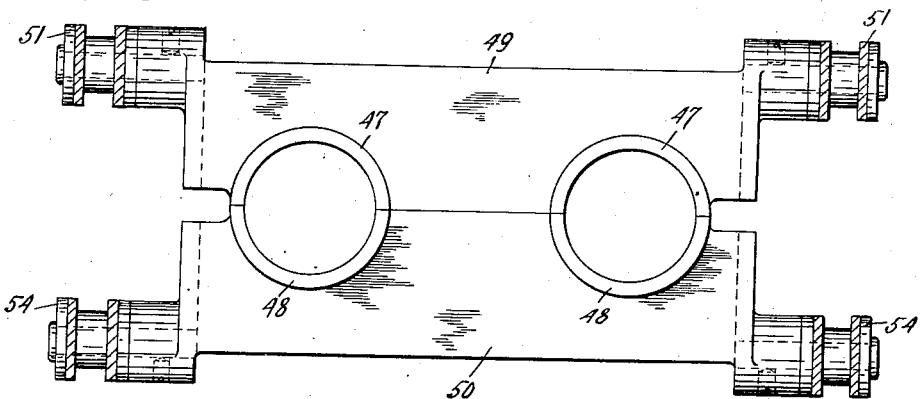
Figure 4:
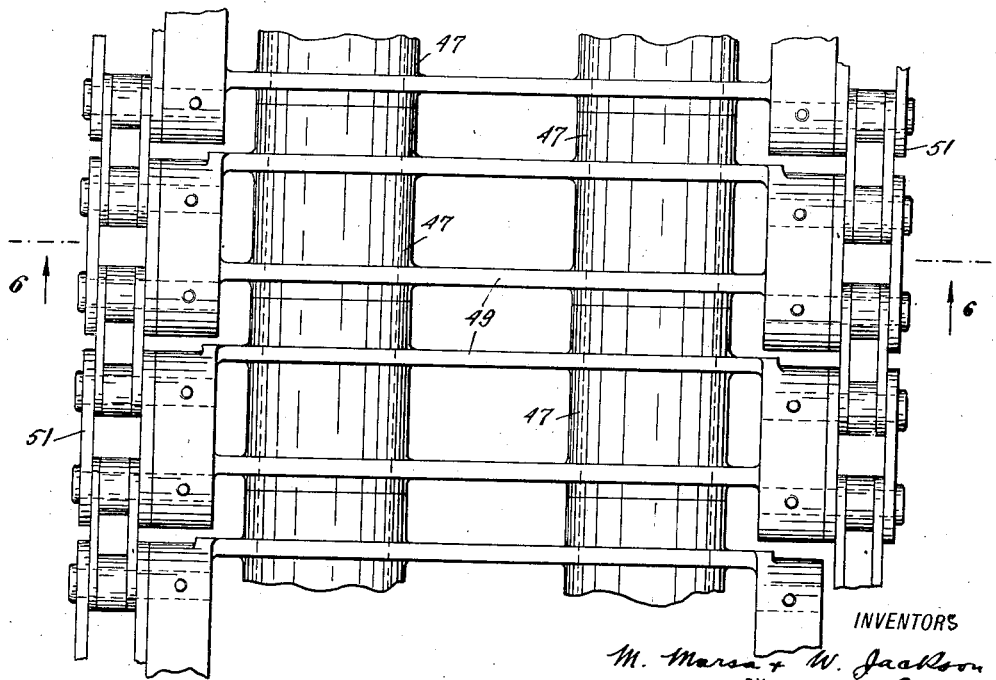

One of the many possible embodiments of a machine with which the present process is put in practice, is illustrated in the accompanying drawings, in which:

Figure 1 is a side elevation of the improved machine; Fig. 2 is a top plan view thereof, partly in section; Fig. 3 is a side elevation of the two sets of complementary semi-tubular tube sections, and the connecting means thereof, on a larger scale; Fig. 4 is a top plan view of the said tube sections; Fig. 5 is a front elevation of two complementary semi-tubular tube sections; Fig. 6 is a section taken on line 6—6 of Fig. 4; Fig. 7 is a transverse section taken through the hopper and the feeding means; and Fig. 8 is a longitudinal section taken through the said hopper and feeding means.

Referring now to the drawings, the numeral 10 indicates the base or main frame of the machine, on which is mounted a hopper 11 into which the properly treated comminuted cork is placed. This hopper is provided with a plurality of, in the present case two, tubular outlets 12, which extend, preferably, horizontally. In alignment with these outlets, the front wall 13 and the rear wall 14 of the hopper are connected by semi-tubular members 15, the latter being either fixed to the hopper or made integral therewith. Below these semi-tubular members there is reciprocably mounted upon the bottom of the hopper a slide 16, having four semi-cylindrical recesses 17, so positioned that, when two of the same are in registering positions with the semi-tubular members 15, the others are ready to receive material from the hopper (Fig. 7). The slide 16 is of a width corresponding to that of the hopper bottom and the diameters of the recesses 17 correspond to the inner diameters of the semi-tubular members 15. The slide is actuated from the main driving shaft 18 of the machine, which shaft may be driven from any suitable source of power. This shaft is journaled in bearings 19 and has keyed to it a bevel gear 20, in mesh with a similar gear 21 on a shaft 22, the latter being journaled in bearings 23. To the shaft 22 is fixed a spur gear 24, in mesh with a gear 25 on a shaft 26. The shaft 26 is journaled in bearings 27 and carries a cam 28, with which co-operates an anti-friction roller 29 on a lever 30, one end of which is fulcrumed at 31 to a bracket 32. To the other end of this lever is pivoted at 33 one end of a link 34, the other end of which is pivoted at 35 to the slide 16. A spring 36, attached to the lever 30 and to a bracket 37, serves to hold the anti-friction roller 29 continuously in contact with the cam 28. The cam is so constructed that the slide 16 is intermittently moved, it being kept stationary for a period hereinafter to be specified when two of its recesses 17 are in alignment with the semi-tubular members 15.

The feeding and compressing mechanism consists of two plungers 38, which are adapted to reciprocate in guides 39 and 40. The guides 40 are formed on the rear wall 14 of the hopper, in the said rear wall being formed openings 40', through which the said plungers are adapted to move into the hopper, feeding the comminuted cork in the semi-tubular members 15 and recesses 17 in alignment therewith into the tubular outlets 12 of the hopper, and thence into the tubes or chambers in which the comminuted cork is treated. The plungers 38 are connected, for instance, by a transverse bar 41, with which is engaged the slotted end 42 of a lever 43, the latter being fulcrumed at 44 to the base 10. This lever is connected by a link 45 with a crank-disk 46, that is keyed to the shaft 22. In this manner, longitudinal movement is imparted to the plungers. The cam 28 and the crank-disk 46 are so timed that the slide 16 is kept stationary, say for instance in the position shown in Fig. 7 of the drawings, while the inner ends of the plungers are in engagement with the said slide both on the feeding stroke of the said plungers and on the idle stroke thereof. As soon as the inner ends of the plungers are disengaged from the slide on their idle stroke, the slide is moved to bring those cylindrical recesses thereof into alignment with the tubular member 16, which have been filled with comminuted cork on the previous feeding stroke of the plungers.

Each of the plungers co-operates with a mold. Each mold is composed of two sets of semi-tubular tube sections, denoted by the numerals 47 and 48. The two molds are arranged side by side, they being spaced apart a distance obviously corresponding to that between the plungers, as clearly appears from Fig. 2 of the drawings. The corresponding tube sections 47 of the mold are connected by rigid ribs 49, (Figs. 5 and 6), and the corresponding tube sections 48 of the mold are connected by ribs 50, (Figs. 5 and 6). The sections 47 of the molds are attached to two endless chains 51, each of the same running over sprocket wheels 52 and 53, and in a similar manner are the tube sections 48 fixed to two endless chains 54, each of the latter running over sprocket wheels 55 and 56. The sprocket wheels are keyed to shafts 57, journaled in bearings 58 on standards 59. The several endless chains and the tube sections thereon are so disposed in relation to each other that the sections 47 meet the sections 48 at the hopper outlet 12 and are held in abutting tube-forming relation in alignment with the outlet 12 for a considerable distance, thereby forming molds into which the comminuted material is packed. The length of each mold is predetermined by the distance between the two sprocket wheels over which each endless chain runs, and this length is so selected that the material is not only properly packed into the mold but also subjected to the temperature that is sufficient to affect the binding agent, as will hereinafter appear. The tube sections are driven in any suitable manner, for instance, from the driving shaft 18. For this purpose there may be provided upon the last-mentioned shaft a worm 60, in mesh with a worm gear 61 on one of the sprocket wheel shafts 57. To the same shaft is fixed a gear 62, in mesh with a gear 63 on a shaft 57 that is associated with the other set of tube sections, the arrangement being such that the endless chains are driven at a comparatively slow speed.

In order to hold the tube sections in abutting tube-forming positions, guide rails 64 and 65 are provided, which rails bear against the ribs 49 and 50, respectively, the guide rails 65 being disposed below the acting portions of the chains 54 and the guide rails 64 above the acting portions of the chains 51 (Fig. 1).

Heat is applied to the molds by any suitable heating means, for instance by gas burners 66 and 67, the former being disposed above and the burner 67 below the tube sections when the same are held in abutting positions (Fig. 1).

The operation of this machine is as follows: The comminuted cork dropping into two of the recesses 17 of the slide 16 is brought below the semi-tubular members 15 when the plungers are disengaged from the latter. The plungers, on their feeding stroke, advance the cork through the tubular outlets 12 into the molds into contact with the previously fed cork, or, if no cork be in the molds, the desired condition of pressure, etc., may be brought about by plugging the said molds until the mold is filled, when the plugs will be driven out by the accumulated cork. The molds are driven at such a speed that the cork is properly compressed therein and, as the compressed cork is advanced, the binding agent is coagulated so that it becomes insoluble and binds the particles of cork firmly together. The burners 66 and 67 do not extend to the sprocket wheels 53 and 56, so that the cork columns or rods are cooled before they issue from the molds, thereby permanently maintaining their form.

The extruded rods or columns of cork are severed into sections of desired length, or thickness to form bottle sealing disks, packing disks, gaskets, etc. If desired, the rods before being severed, or the severed sections thereof may be coated or treated to give increased water or gas resistant qualities.

It is obvious that while herein a specific feeding means has been described and a specific manner of actuating the tube sections has been disclosed, any other may be used without departing from the invention, which lies mainly in the provision of two sets of mold sections which are brought into abutting positions to form a mold into which the cork is packed and in which it is, simultaneously with the packing operation, treated to unite the cork particles.

What we claim is:—

1. In an apparatus for extruding cork, the combination with two sets of mold sections, of means for continuously bringing said two sets of mold sections into abutting mold-forming relation so as to obtain a continuous mold through which the cork is extruded, and a reciprocable plunger for feeding comminuted cork to said mold.

2. In an apparatus for extruding cork, the combination with two sets of continuously moving mold sections, of means for bringing said two sets into abutting mold-forming relation so as to obtain a continuous mold through which the cork is extruded, and a reciprocable plunger for feeding comminuted cork to said mold.

3. In an apparatus for extruding cork, the combination with two sets of mold sections, of means for continuously bringing said two sets of mold sections into abutting mold-forming relation, holding the same in such abutting positions and thereafter separating the same, whereby a continuous mold is obtained through which the cork is extruded, and a reciprocable plunger for feeding comminuted cork to said mold.

4. In an apparatus for extruding cork, the combination with two sets of interconnected mold sections, of means for continuously bringing said two sets of mold sections into abutting mold-forming relation so as to obtain a continuous mold through which the cork is extruded, and a reciprocable plunger for feeding comminuted cork to said mold.

5. In an apparatus for extruding cork, the combination with two sets of mold sections, each set being interconnected to form an endless chain, means for actuating said endless chains to bring said two sets of mold sections into abutting mold-forming relation so as to obtain a continuous mold through which the cork is extruded, and a reciprocable plunger for feeding comminuted cork to said mold.

6. An apparatus according to claim 5, comprising means for preventing transverse movement of the two sets of mold sections while in mold-forming relation.

7. An apparatus according to claim 1, comprising means for preventing transverse movement of the two sets of mold sections while in mold-forming relation.

8. An apparatus according to claim 2, comprising means for preventing transverse movement of the two sets of mold sections while in mold-forming relation.

9. An apparatus according to claim 3, comprising means for preventing transverse movement of the two sets of mold sections while in mold-forming relation.

10. An apparatus according to claim 1, comprising means for heating said mold sections during a portion of the time in which they are held in mold-forming relation.

11. An apparatus according to claim 2, comprising means for heating said mold sections during a portion of the time in which they are held in mold-forming relation.

12. An apparatus according to claim 3, comprising means for heating said mold sections during a portion of the time in which they are held in mold-forming relation.

13. An apparatus according to claim 5, comprising means for preventing transverse movement of the two sets of mold sections while in mold-forming relation and means for heating said mold sections during a portion of the time in which they are held in mold-forming relation.

14. In an apparatus for extruding cork, the combination with two sets of semi-tubular mold sections, of means for continuously bringing said two sets of mold sections into abutting tube-forming relation so as to obtain a continuous tube through which the cork is extruded, and a reciprocable plunger for feeding comminuted cork through said tube.

15. The process of extruding cork, which consists in forcing comminuted cork and a binder through a constantly moving confining tube by supplying cork to the entrance and applying pressure thereto, and heating that section of the tube which is adjacent the entrance thereof.

Signed at New York, in the county of New York, and State of New York, this 17th day of June, A. D., 1924.

MELCHOR MARSA.
WILLIAM JACKSON.